United States Patent
Cho

(10) Patent No.: US 10,482,620 B2
(45) Date of Patent: Nov. 19, 2019

(54) METHOD AND DEVICE FOR PRODUCING DEPTH INFORMATION

(71) Applicant: LIGHT AND MATH INC., Jecheon-si (KR)

(72) Inventor: Sunggoo Cho, Jecheon-si (KR)

(*) Notice: Subject to any disclaimer, the term of this patent is extended or adjusted under 35 U.S.C. 154(b) by 0 days.

(21) Appl. No.: 16/225,297

(22) Filed: Dec. 19, 2018

(65) Prior Publication Data

US 2019/0197717 A1 Jun. 27, 2019

(30) Foreign Application Priority Data

Dec. 22, 2017 (KR) .................. 10-2017-0178417

(51) Int. Cl.
| | | |
|---|---|---|
| *G06T 7/593* | (2017.01) | |
| *G06T 7/11* | (2017.01) | |
| *G02B 5/23* | (2006.01) | |
| *G06T 3/40* | (2006.01) | |
| *G06T 5/50* | (2006.01) | |
| *G06T 5/00* | (2006.01) | |

(52) U.S. Cl.
CPC .............. *G06T 7/593* (2017.01); *G02B 5/23* (2013.01); *G06T 3/4053* (2013.01); *G06T 5/003* (2013.01); *G06T 5/50* (2013.01); *G06T 7/11* (2017.01); *G06T 2207/10024* (2013.01); *G06T 2207/20081* (2013.01)

(58) Field of Classification Search
None
See application file for complete search history.

(56) References Cited

U.S. PATENT DOCUMENTS

| | | | | |
|---|---|---|---|---|
| 2011/0069377 | A1* | 3/2011 | Wu | ............... G02B 1/007 359/356 |
| 2012/0189293 | A1* | 7/2012 | Cao | ............... G03B 9/02 396/333 |
| 2014/0009646 | A1* | 1/2014 | Attar | ............... H04N 5/2226 348/262 |

FOREIGN PATENT DOCUMENTS

| | | |
|---|---|---|
| JP | 2009-284188 | 12/2009 |
| KR | 10-2014-0054797 | 5/2014 |
| KR | 10-2014-0120527 | 10/2014 |

OTHER PUBLICATIONS

English Specification of 10-2014-0054797.
English Specification of 2009-284188.
English Specification of 10-2014-0120527.

* cited by examiner

*Primary Examiner* — David Perlman
(74) *Attorney, Agent, or Firm* — Antonio Ha & U.S. Patent, LLC

(57) ABSTRACT

According to an embodiment, a method for producing depth information comprises obtaining a plurality of images of an object from a plurality of lens modules, the plurality of images including at least two monochromatic images forming a monochromatic stereo image, producing two complemented monochromatic images by performing a complementary image enhancing process on at least part of the two monochromatic images, the complementary image enhancing process including comparing the plurality of images with each of the two monochromatic images and increasing a resolution of each of the two monochromatic images using an image having a higher resolution in the at least part, selecting a region of interest of the object from the two complemented monochromatic images, and calculating a (Continued)

depth of the region of interest by stereo-matching the two complemented monochromatic images.

14 Claims, 9 Drawing Sheets

METHOD AND DEVICE FOR PRODUCING DEPTH INFORMATION

CROSS-REFERENCE TO RELATED APPLICATION(S)

This application is based on and claims priority under 35 U.S.C. § 119 to Korean Patent Application No. 10-2017-0178417, filed on Dec. 22, 2017, in the Korean Intellectual Property Office, the disclosure of which is incorporated by reference herein in its entirety.

TECHNICAL FIELD

Embodiments of the disclosure relate to methods and devices for producing depth information.

DISCUSSION OF RELATED ART

The depth of an object may be obtained actively by adopting a separate light source or passively using the ambient light. The two schemes have their own pros and cons.

Embodiments of the disclosure regard technology of producing depth information using a passive scheme, and particularly, methods and devices for producing depth information using a stereo camera. Stereo images are generated using a stereo camera module.

FIGS. 1a and 1b are views illustrating a stereo camera module according to the prior art.

Referring to FIG. 1a, the stereo camera module includes image sensors I (e.g., charged coupling devices (CCDs) or complementary metal oxide semiconductor (CMOS)), color filters 13 mounted on the image sensors I, and two lens modules 11 and 12 positioned over the color filters 13 to focus light beams from an object O on the image sensors I.

Each color filter 13 is partitioned into multiple red (R), green (G), and blue (B) portions which transmit their respective corresponding wavelengths of light. Each pixel of an image captured represents a color by interpolating and combining the R, G, and B values adjacent the pixel of the image sensor I.

The prior art may geometrically calculate the depth of an object by measuring the distance between two matching pixels in a stereo image captured for the object using two lens modules 11 and 12.

However, the prior art may encounter the following issues.

Upon calibrating the lens modules for depth calculation purposes, an enormous calibration error may arise due to distortion or other optical aberration. Moreover, a blur may be likely, causing a pixel mismatch. Reducing the aperture to mitigate blurs may bring about resolution deterioration, with the result of more errors.

Where the distance between the two lens modules in a stereo camera module, such as of a smartphone is very short, the pixel mismatch issue may worsen. Thus, a need exists for reducing errors in stereo camera modules with a short inter-lens module distance.

SUMMARY

According to an embodiment, a method for producing depth information comprises obtaining a plurality of images of an object from a plurality of lens modules, the plurality of images including at least two monochromatic images forming a monochromatic stereo image, producing two complemented monochromatic images by performing a complementary image enhancing process on at least part of the two monochromatic images, the complementary image enhancing process including comparing the plurality of images with each of the two monochromatic images and increasing a resolution of each of the two monochromatic images using an image having a higher resolution in the at least part, selecting a region of interest of the object from the two complemented monochromatic images, and calculating a depth of the region of interest by stereo-matching the two complemented monochromatic images. The plurality of images include at least one color image of the object. The color image includes a blurred region different from a blurred region of at least one of the two monochromatic images or includes more pixels per unit area than each of the two monochromatic images. The complementary image enhancing process includes increasing a resolution of the blurred region of the at least one of the two monochromatic images using the color image.

According to an embodiment, a method for producing depth information comprises obtaining a plurality of images of an object from a plurality of lens modules, the plurality of images including at least two monochromatic images forming a monochromatic stereo image, selecting a region of interest of the object from the two monochromatic images, producing two complemented monochromatic images by performing a complementary image enhancing process on the region of interest, the complementary image enhancing process including comparing the plurality of images with each of the two monochromatic images and increasing a resolution of the region of interest of each of the two monochromatic images using an image having a higher resolution in the region of interest, and calculating a depth of the region of interest by stereo-matching the two complemented monochromatic images. The plurality of images include at least one color image of the object. The color image includes a blurred region different from a blurred region of at least one of the two monochromatic images or includes more pixels per unit area than each of the two monochromatic images. The complementary image enhancing process includes increasing a resolution of the blurred region of the at least one of the two monochromatic images using the color image.

The two monochromatic images may at least partially include different blurred regions. The complementary image enhancing process may include increasing the resolution of the blurred region of one of the two monochromatic images using a corresponding region of the other of the two monochromatic images.

At least some of the plurality of lens modules may have different f-numbers.

Among the plurality of lens modules, two lens modules configured to form the two monochromatic images may be spaced apart from each other on an image sensor.

The complementary image enhancing process may include further using a super resolution method to increase the resolution of the region of interest.

The super resolution method may include using artificial intelligence (AI) data obtained by AI-learning a plurality of low-resolution images and a plurality of high-resolution images corresponding to the plurality of low-resolution images.

According to an embodiment, a device configured to produce depth information comprises a monochromatic stereo camera module configured to capture at least one monochromatic stereo image from an object, a data storage unit configured to store the monochromatic stereo image captured by the monochromatic stereo camera module, and a data processor configured to process the monochromatic stereo image stored in the data storage unit. The monochromatic stereo camera module includes an image sensor, a plurality of lens modules spaced apart from each other on the image sensor, and monochromatic filters disposed to allow light paths formed by each of the plurality of lens modules and the image sensor to pass therethrough. For example, the monochromatic filters may be disposed ahead of the lens modules or between the lens modules and the image sensor. For example, the monochromatic filters, the lens modules, and the image sensor may be aligned along light paths in the order of the monochromatic filters, the lens modules, and the image sensor or in the order of the lens modules, the monochromatic filters, and the image sensor. At least two of the plurality of lens modules have different depths of field (DOFs). The data processor is configured to calculate a depth of a region of interest by comparing at least two monochromatic images forming the monochromatic stereo image, performing a complementing process to raise a resolution of one monochromatic image containing a blurred region among the at least two monochromatic images using another among the at least two monochromatic images, and performing stereo matching. The plurality of lens modules include four lens modules. The monochromatic filters include a first monochromatic filter and a second monochromatic filter having a different color from the first monochromatic filter, wherein the first monochromatic filter is disposed to allow light paths formed by the image sensor and each of two of the four lens modules to pass therethrough, and the second monochromatic filter is disposed to allow light paths formed by the image sensor and each of the rest of the four lens modules to pass therethrough. For example, the monochromatic filters may be disposed ahead of the lens modules or between the lens modules and the image sensor. For example, the monochromatic filters, the lens modules, and the image sensor may be aligned along light paths in the order of the monochromatic filters, the lens modules, and the image sensor or in the order of the lens modules, the monochromatic filters, and the image sensor.

At least two of the plurality of lens modules may have different f-numbers.

According to an embodiment, a device for producing depth information comprises a monochromatic stereo camera module configured to capture at least one monochromatic stereo image from an object, a color camera module configured to capture a color image from the object, a data storage unit configured to store the images captured by the monochromatic stereo camera and the color camera module, and a data processor configured to process the images stored in the data storage unit. The monochromatic stereo camera module may include a first image sensor, a plurality of first lens modules spaced apart from each other on the first image sensor, and a plurality of monochromatic filters disposed to allow light paths formed by the first image sensor and each of at least two of the plurality of first lens modules to pass therethrough. For example, the monochromatic filter may be disposed ahead of each lens module or between each lens module and the first image sensor. For example, the monochromatic filter, each lens module, and the first image sensor may be aligned along the light paths in the order of the monochromatic filter, the lens module, and the first image sensor or in the order of the lens module, the monochromatic filter, and the first image sensor. The color camera module includes a second image sensor, a second lens module disposed on the second image sensor, and a color filter disposed to allow a light path formed by the second lens module and the second image sensor to pass therethrough. For example, the color filter may be disposed between the second lens module and the second image sensor. For example, the color filter, the second lens modules, and the second image sensor may be aligned along the light path in the order of the second lens module, the second filter, and the second image sensor. The data processor is configured to calculate a depth of a region of interest by performing a complementing process to a resolution of at least one of at least two monochromatic images forming the monochromatic stereo image using the color image and performing stereo matching. The color image is configured to be a complementary image to the monochromatic image by including a blurred region different from a blurred region of at least one of the at least two monochromatic images or including more pixels per unit area than the monochromatic images.

The monochromatic stereo camera module may further include a lens formed of a metamaterial.

BRIEF DESCRIPTION OF DRAWINGS

More complete appreciation of the disclosure and many of the attendant aspects thereof will be readily obtained as the same becomes better understood by reference to the following detailed description when considered in connection with the accompanying drawings, wherein.

DETAILED DESCRIPTION OF EXEMPLARY EMBODIMENTS

Hereinafter, exemplary embodiments of the disclosure will be described in detail with reference to the accompanying drawings. The same reference denotations may be used to refer to the same or substantially the same elements throughout the specification and the drawings. As used herein, the singular forms "a," "an," and "the" are intended to include the plural forms as well, unless the context clearly indicates otherwise. Embodiments of the disclosure, however, may be modified in various different ways, and should not be construed as limited to the embodiments set forth herein. It will be understood that when an element or layer is referred to as being "on," "connected to," "coupled to," or "adjacent to" another element or layer, it can be directly on, connected, coupled, or adjacent to the other element or layer, or intervening elements or layers may be present.

Such denotations as "first," "second," "A," "B," "(a)," and "(b)," may be used in describing the components of the present invention. These denotations are provided merely to distinguish a component from another, and the essence of the components is not limited by the denotations in light of order or sequence.

As used herein, the term "near limit of acceptable sharpness" is defined as a distance from a camera, at which objects start to appear acceptably sharp in an image, and the term "far limit of acceptable sharpness" is defined as a distance from the camera, beyond which objects stop appearing acceptably sharp in an image. For example, "near limit of acceptable sharpness" and "far limit of acceptable sharpness," respectively, may refer to the shortest and longest distance at which objects in an image may appear sharp.

As used herein, the term "depth of field" (abbreviated as "DOF") is defined as a distance between the near limit of acceptable sharpness and the far limit of acceptable sharpness, at which objects in an image appear sharp, and the term "object plane" is defined as the plane or position which brings about best focusing in designing lens modules. Thus, the object plane exists between the near limit of acceptable sharpness and the far limit of acceptable sharpness.

Described below is the concept of complementary image enhancing.

Figure 2:
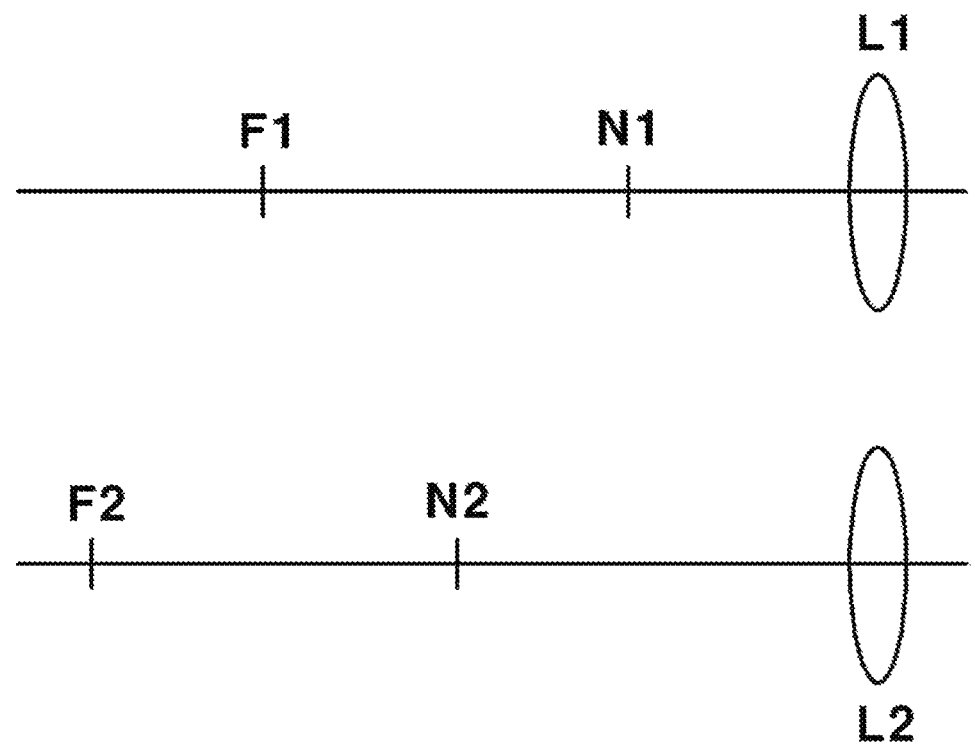
FIG. 2 is a view illustrating the concept of complementary image enhancing according to an embodiment.

FIG. 2 is a view illustrating the concept of complementary image enhancing according to an embodiment.

As used herein, the term "lens module" may encompass a single lens or multiple lenses, and the term "camera module" may encompass a lens module, an optical filter (e.g., a monochromatic filter or color filter), and an image sensor.

An object positioned out of the DOF of a camera module may be blurred, exhibiting a reduced resolution. A blurred region of an image may be enhanced using two camera modules with different DOFs. This may also apply where two lens modules share one image sensor.

In a hypothetical example, there are two lens modules, one of which has a short object plane distance, and the other longer. For example, where a first lens module L1 has a first near limit of acceptable sharpness N1 and a first far limit of acceptable sharpness F1, and a second lens module L2 has a second near limit of acceptable sharpness N2 and a second far limit of acceptable sharpness F2 (where F2 may be infinite) as shown in FIG. 2, an object positioned between the first far limit of acceptable sharpness F1 and the second far limit of acceptable sharpness F2 may be blurred where it is the one captured by the first lens module L1, but appear sharp where captured by the second lens module L2. Conversely, an object positioned between the first near limit of acceptable sharpness N1 and the second near limit of acceptable sharpness N2 may be shown sharp where it is the one captured by the first lens module L1 but not—e.g., blurred—where captured by the second lens module L2. For objects positioned between the first far limit of acceptable sharpness F1 and the second far limit of acceptable sharpness F2, images captured by the first lens module L1 may be enhanced using the pixels of images captured by the second lens module L2, and for objects positioned between the first near limit of acceptable sharpness N1 and the second near limit of acceptable sharpness N2, images captured by the second lens module L2 may be enhanced by the pixels of images captured by the first lens module L1. As such, a whole sharp image may be obtained by using both an image with a blurred region and another with a sharp region.

It is assumed as an example that there are two images, e.g., a first image and a second image. Where a certain region of the first image is better in resolution than a region of the second image corresponding thereto, it is possible to enhance the resolution of the region of the second image using the first image. In this case, the first image may be referred to as a 'complementary image' to the second image. Where another region of the first image is worse than another region of the second image corresponding thereto, the second image may be referred to as a 'complementary image' to the first image. In this case, the first image and the second image may be referred to as 'mutually complementary images.'

The first camera module providing the first image and the second camera module providing the second image may be referred to as 'mutually complementary camera modules.' Likewise, the lens modules used to capture the first and second images may be referred to as 'mutually complementary lens modules.'

Methods of enhancing a lower-resolution region of an image using a higher-resolution region of another image which corresponds to the lower-resolution region of the image may be herein termed 'complementary image enhancing.'

The definition and concept of f-number (f/#) are described below.

Where f is the focal length of a lens module, and D is the diameter of the entrance pupil, f-number (f/#) is defined as f/D. As f-number decreases, objects positioned closer or farther than the object plane may become out of focus and further blurred, causing the DOF to decrease. In other words, as F-number increases, the DOF may generally increase. Although the DOF may be reduced by decreasing f-number, D may be designed to be larger to raise the resolution of the lens module.

Super resolution and artificial intelligence (AI) are described below.

Figure 3:
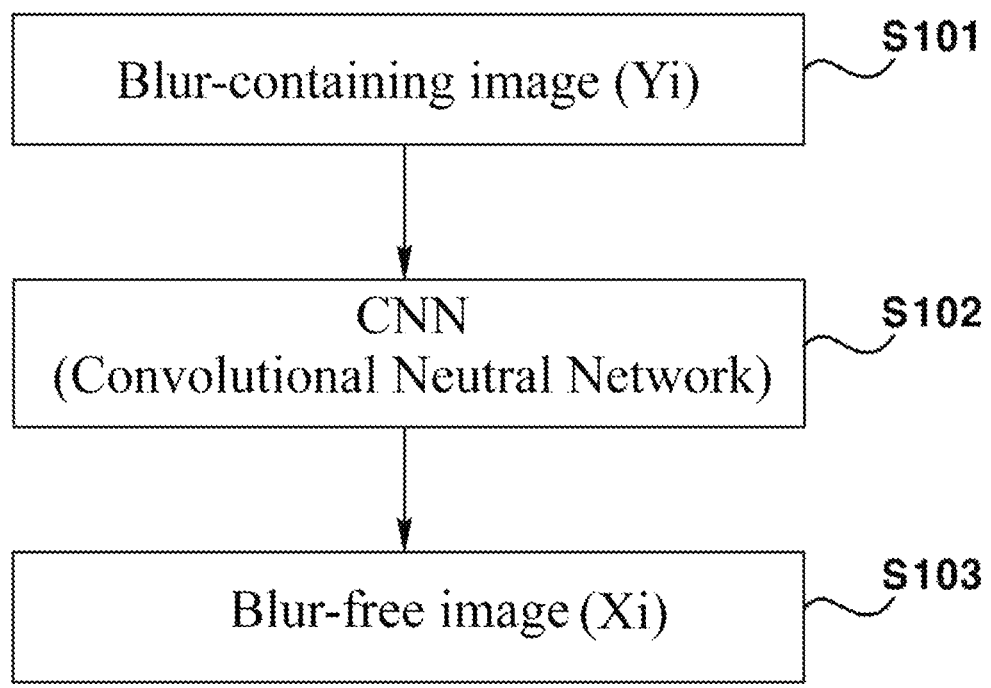
FIG. 3 is a flowchart illustrating an AI-applied super-resolution method according to an embodiment.

FIG. 3 is a flowchart illustrating an AI-applied super-resolution method according to an embodiment.

As departing from the DOF, an image captured by a camera module may be blurred as set forth above.

Although the object is positioned within the DOF, in-depth view of the image may reveal an optical blur due to, e.g., optical limitations (e.g., point spread function (PSF) or diffraction) or other limitations (e.g., image sensor (e.g., CCD or CMOS) size limit) to the lens module (e.g., shrunken sensor pixels may have difficulty in receiving light, thus causing short noise). An example may be shown from a photo taken by smartphone—the photo may appear blurred when magnified to the maximum.

Embodiments of the disclosure may enhance images using the above-described complementary image enhancing and further enhance the images by performing a super resolution method on blurred pixels that may remain despite the complementary image enhancing.

The super resolution method is a method to obtain a high-resolution (or high-definition) image from a low-resolution image containing noise or blurs, and this method may be realized by a wavelet method, a frequency domain method, or a statistical method. The super resolution method may also be implemented using artificial intelligence (AI).

According to an embodiment, an AI-applied super resolution method may be used to raise the resolution of blur-containing stereo images.

FIG. 3 illustrates an example of such an AI-applied super resolution method. For example, it is possible to obtain blur-free images from blur-containing images by applying a cost function as represented in Equation 1 below to N blur-containing images $Y_i$ and N corresponding blur-free images Xi (where N is a positive integer) and learning using a learning algorithm, e.g., a convolutional neutral network (CNN) (refer to S101, S102, and S103 of FIG. 3).

$$L = \frac{1}{N}\sum_{i=1}^{N}\|F(Y_i) - X_i\|^2 \quad \text{[Equation 1]}$$

Here, F is the AI transformation function, and L is the cost function.

Although the CNN is used herein as an AI scheme, this is merely an example, and embodiments of the disclosure are not limited thereto. Other various AI schemes, such as a generative adversarial network (GAN), may be applied as well.

Now described is a depth information producing device according to an embodiment.

Figure 4:
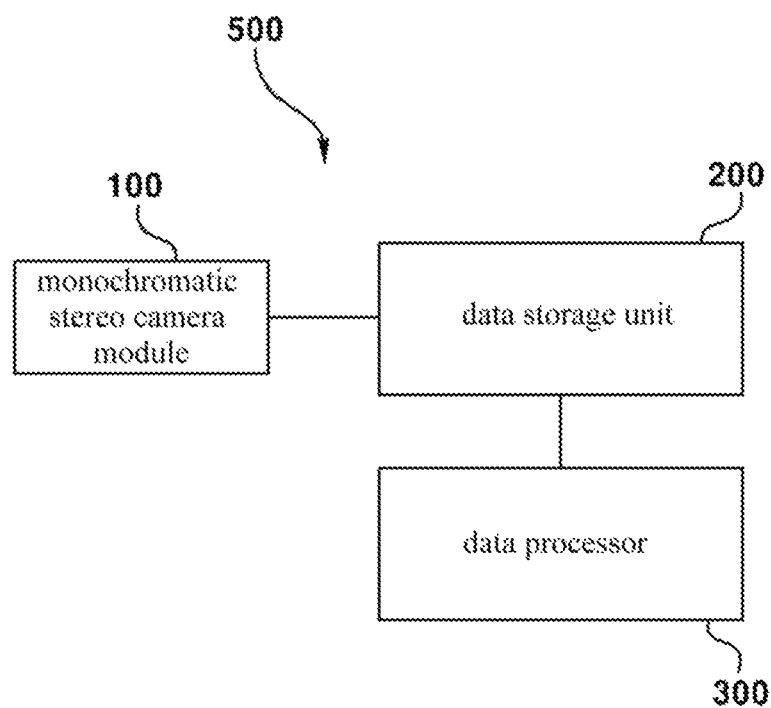
FIG. 4 is a view illustrating a configuration of a depth information producing device according to an embodiment.
Figure 5A:
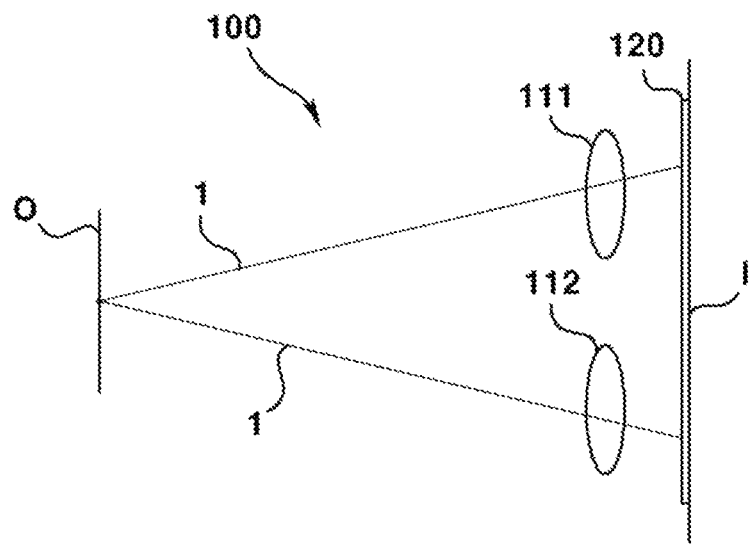
FIGS. 5a and 5b are views illustrating a monochromatic stereo camera module of a depth information producing device according to an embodiment.
Figure 5B:
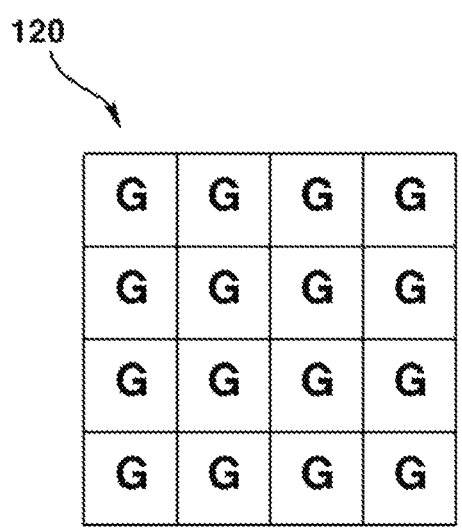

FIG. 4 is a view illustrating a configuration of a depth information producing device according to an embodiment. FIGS. 5a and 5b are views illustrating a monochromatic stereo camera module of a depth information producing device according to an embodiment.

Referring to FIG. 4, according to an embodiment, a depth information producing device 500 may include a monochromatic stereo camera module 100 for capturing at least one monochromatic stereo image, a data storage unit 200 for storing the monochromatic stereo image captured by the monochromatic stereo camera module 100, and a data processor 300 for processing the monochromatic stereo image stored in the data storage unit 200.

The monochromatic stereo camera module 100 may include an image sensor I, a plurality of lens modules 111 and 112 spaced apart from each other on the image sensor I, and a monochromatic filter 120 disposed on the image sensor I to meet light paths formed by the image sensor I and each of the plurality of lens modules 111 and 112. For example, the monochromatic filter 120 may be disposed ahead of each of the lens modules 111 and 112 or between each of the lens modules 111 and 112 and the image sensor I. For example, the monochromatic filter 120, each lens module 111 or 112, and the image sensor I may be aligned along light paths in the order of the monochromatic filter 120, the lens module 111 or 112, and the image sensor I or in the order of the lens module 111 or 112, the monochromatic filter 120, and the image sensor I. The monochromatic filter 120 may be a single-color filter, e.g., a green (G) filter as shown in FIG. 5. However, without limited thereto, the monochromatic filter 120 may be a red (R) filter, a blue (B) filter, or any one of other various filters to filter a single color. For example, the monochromatic filter 120 may be implemented as a combination of single-color monochromatic filters each of which may correspond to a respective one of a plurality of lens modules, e.g., 111 and 112.

The plurality of lens modules 111 and 112 may include mutually complementary lens modules. For example, at least two of the plurality of lens modules 111 and 112 may have different f-numbers and thus different DOFs. For example, the first lens module 111 may present a better (e.g., higher) resolution for shorter distances, and the second lens module 112 may have a larger f-number than the first lens module 111, thus presenting a better (e.g., higher) resolution for long distances.

The data storage unit 200 may store data including the results of AI learning. The data storage unit 200 described herein throughout the specification may be implemented as various types of devices to store data, including, but not limited to, hard-disk drives or memories, such as RAMs or ROMs.

The data processor 300 may compare at least two monochromatic images forming the monochromatic stereo image and perform a complementing process to raise the resolution of one of the two monochromatic images, which contains a blurred region, using a region, corresponding to the blurred region, of the other of the two monochromatic images, and stereo matching, thereby obtaining the depth of a region of interest.

According to an embodiment, the region of interest may be selected by previously designating a particular pixel, such as where the maximum image pixel data value (e.g., raw data) is locally obtained from the pixels of the image sensor I or where a noticeable variation in pixel data value occurs or may be selected by a display (not shown) of the depth information producing device. However, embodiments of the disclosure are not limited, and the region of interest may be chosen in any other various manners. The region of interest may be the whole image.

The above-described configuration may present the following effects.

Figure 1A:
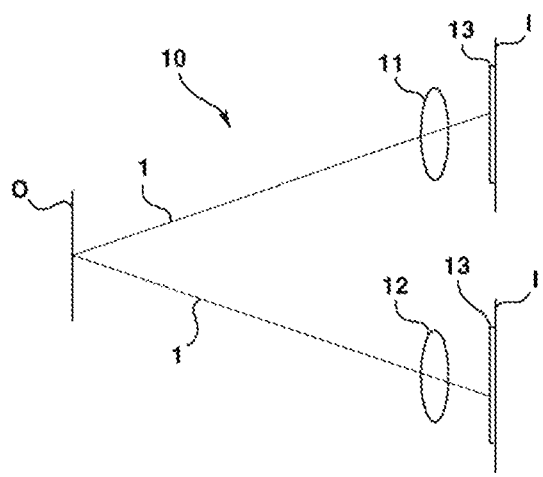
FIGS. 1a and 1b are views illustrating a stereo camera module according to the prior art.
Figure 1B:
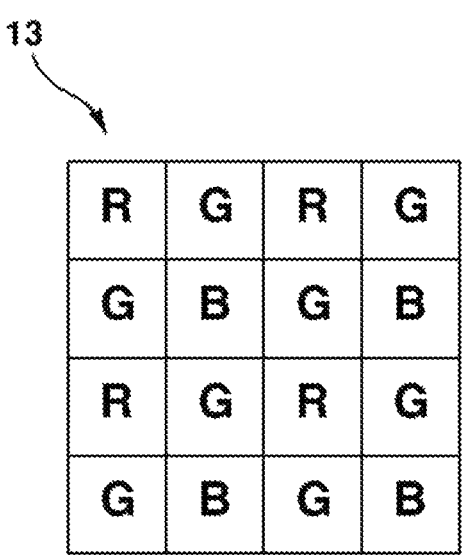

The use of the monochromatic filter 120 may significantly reduce errors in the mutually complementary lens modules 111 and 112. For example, where Bayer color filters are used as shown in FIG. 1(b) according to the prior art, the lens modules (e.g., the lens modules 11 and 12 of FIG. 1) normally use multiple lenses to reduce chromatic aberration and distortion and raise resolution. However, according to an embodiment, the mutually complementary lens modules 111 and 112 may take only a single color (e.g., green in the above-described example) into consideration, thus freeing from chromatic aberration errors and allowing for little or no distortion and hence a reduction in optical errors and an increase in resolution even with a smaller number of lenses. This may significantly reduce calibration errors that may arise due to lens modules upon depth calculation.

The lenses of the monochromatic stereo camera modules to capture monochromatic stereo images may be formed of a metamaterial. The metamaterial is a material formed in a predetermined nanoscale pattern using a metal or dielectric (e.g., titanium dioxide ($TiO_2$)) similar or smaller in size than the wavelength of light to have a property that is not found in naturally occurring materials. As contrasted by other materials commonly adopted to produce lenses, such as glass or plastic, the metamaterial may mitigate resolution deterioration that the other lens materials wouldn't and present a subwavelength resolution. Thus, forming the lens modules 111 and 112 of the monochromatic stereo camera module 100 using the metamaterial may considerably reduce calibration errors, allowing for more accurate calculation.

The structure in which the mutually complementary lens modules 111 and 112 are installed in one image sensor I may much further reduce pixel mismatches upon calculating the distance between positions on the image sensor I corresponding to regions of interest of the object than the conventional structure in which an image sensor is provided for each lens module.

Further, the use of the mutually complementary lens modules 111 and 112 may enable easier image enhancement on the blurred region of the image captured by each lens module 111 and 112 regardless of whether the object is positioned close or far away, thereby leading to an increased resolution.

According to an embodiment, a low-resolution region may be rendered to have a higher resolution by using the lens modules with different object plane positions. Further, according to an embodiment, an AI-adopted or AI-based super resolution method is used to allow the region of interest a further enhanced resolution. Thus, the depth of the region of interest may be precisely calculated and obtained.

Other example configurations of the depth information producing device are described below.

Figure 6:
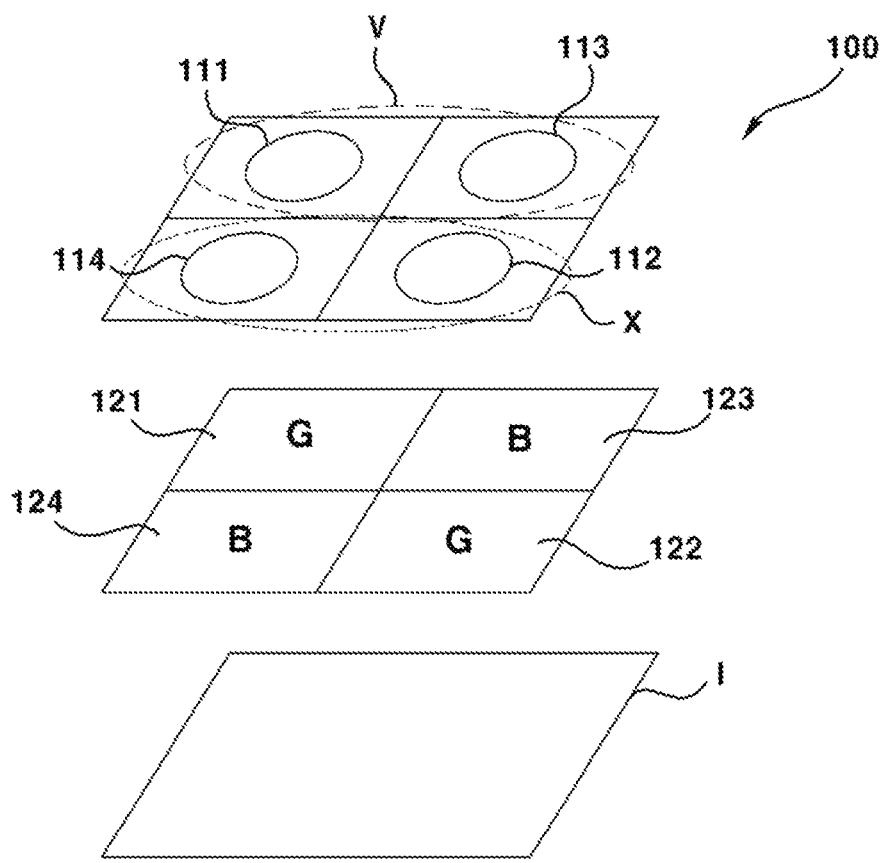
FIGS. 6 and 7 are views illustrating examples of a monochromatic stereo camera module with a plurality of lens modules in a depth information producing device according to embodiments.
Figure 7:
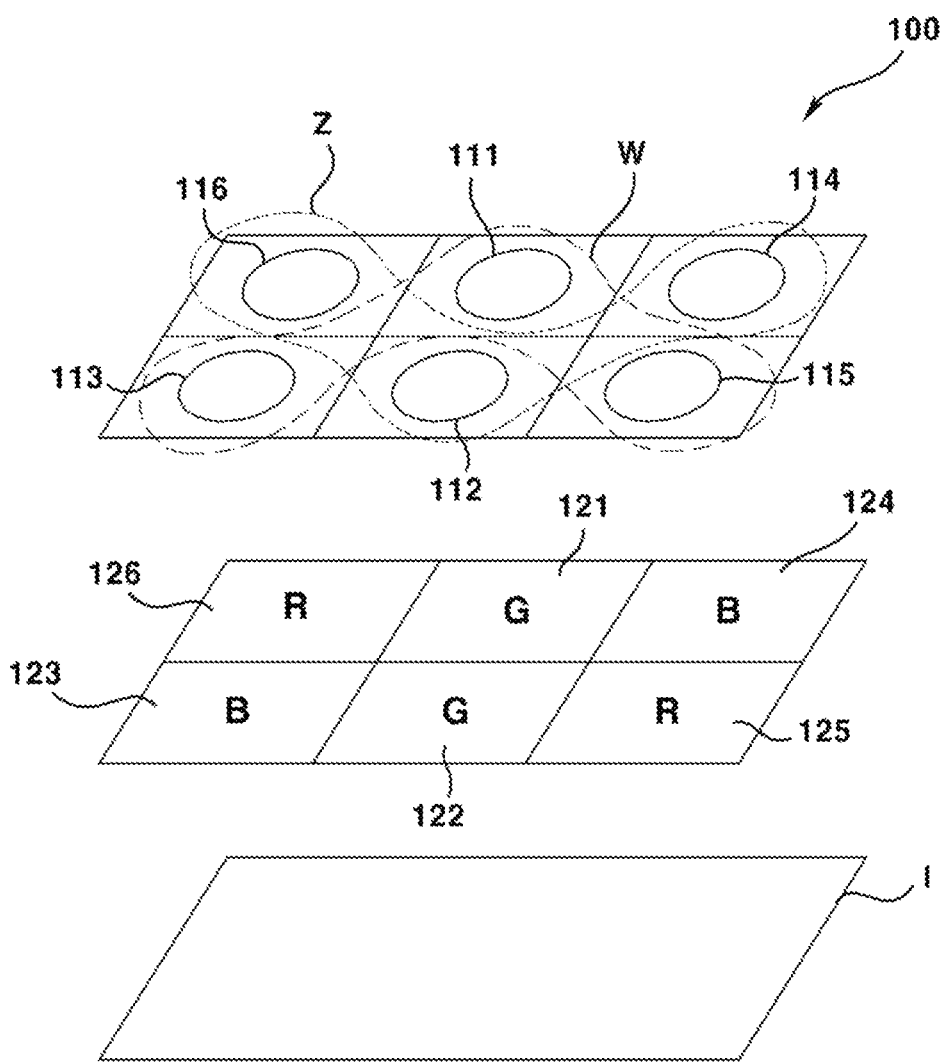

FIGS. 6 and 7 are views illustrating examples of a monochromatic stereo camera module with a plurality of lens modules in a depth information producing device according to embodiments.

Referring to FIG. 6, a monochromatic stereo camera module 100 of a depth information producing device may include four lens modules 111, 112, 113, and 114. The monochromatic stereo camera module 100 may further include first monochromatic filters 121 and 122 and second monochromatic filters 123 and 124 which are different in color from the first monochromatic filters 121 and 122. The first monochromatic filters 121 and 122 are disposed to allow light paths formed by two 111 and 112 of the four lens modules 111, 112, 113, and 114 and the image sensor I to pass therethrough. For example, the first monochromatic filters 121 and 122 may be disposed ahead of the lens modules 111 and 112 or between the lens modules 111 and 112 and the image sensor I. For example, the first monochromatic filters 121 and 122, the lens modules 111 and 112, and the image sensor I may be aligned along light paths in the order of the first monochromatic filters 121 and 122, the lens modules 111 and 112, and the image sensor I or in the order of the lens modules 111 and 112, the first monochromatic filters 121 and 122, and the image sensor I. The second monochromatic filters 123 and 124 are disposed to allow light paths formed by the other two 113 and 114 and the image sensor I to pass therethrough. For example, the second monochromatic filters 123 and 124 may be disposed ahead of the lens modules 113 and 114 or between the lens modules 113 and 114 and the image sensor I. For example, the second monochromatic filters 123 and 124, the lens modules 113 and 114, and the image sensor I may be aligned along light paths in the order of the second monochromatic filters 123 and 124, the lens modules 113 and 114, and the image sensor I or in the order of the lens modules 113 and 114, the second monochromatic filters 123 and 124, and the image sensor I.

Referring to FIG. 6, the monochromatic stereo camera module 100 is structured so that the monochromatic filters 121, 122, 123, and 124 are mounted apart at a predetermined distance over the single image sensor I (e.g., CCD or CMOS), and the four lens modules 111, 112, 113, and 114 configured to focus on the single image sensor are mounted apart at a predetermined distance from the monochromatic filters 121, 122, 123, and 124.

As shown in FIG. 6, the monochromatic filters 121, 122, 123, and 124 may be configured with two green filters diagonally arrayed and two blue filters diagonally arrayed. However, without limited thereto, the monochromatic filters 121, 122, 123, and 124 may be configured with two red filters and two green filters or two red filters and two blue filters, or with two filters in a first color and the other two in a second color different from the first color.

The first and second lens modules 111 and 112 may be mutually complementary lens modules, and the third and fourth lens modules 113 and 114 may be mutually complementary lens modules. For example, a first group V of the first and third lens modules 111 and 113 may present a better resolution for short distances, and a second group X of the second and fourth lens modules 112 and 114 may be larger in f-number than the first group V and thus present a better resolution for long distances. Thus, a low-resolution region may be rendered to have a higher resolution by using the lens modules with different object plane positions. Further, the resolution of the region of interest may be further enhanced by a super resolution method.

Referring to FIG. 7, the monochromatic stereo camera module 100 is structured so that monochromatic filters 121, 122, 123, 124, 125, and 126 are mounted apart at a predetermined distance over a single image sensor I (e.g., CCD or CMOS), and six lens modules 111, 112, 113, 114, 115, and 116 configured to focus on the single image sensor are mounted apart at a predetermined distance from the monochromatic filters 121, 122, 123, 124, 125, and 126.

The monochromatic filters 121, 122, 123, 124, 125, and 126 may be configured in three pairs each of which consists of two filters of the same color, e.g., two red (R) filters, two green (G) filters, and two blue (B) filters which are arrayed as shown in FIG. 7.

The first and second lens modules 111 and 112 may be mutually complementary lens modules, the third and fourth lens modules 113 and 114 may be mutually complementary lens modules, and the fifth and sixth lens modules 115 and 116 may be mutually complementary lens modules. For example, a third group W of the first, third, and fifth lens modules 111, 113, and 115 may present a better resolution for short distances, and a fourth group Z of the second, fourth, and sixth lens modules 112, 114, and 116 may be larger in f-number than the third group W and thus present a better resolution for long distances.

Thus, a low-resolution region may be rendered to have a higher resolution by using the lens modules with different object plane positions. Further, according to an embodiment, an AI-adopted or AI-based super resolution method is used to allow the region of interest a further enhanced resolution.

Another example configuration of the depth information producing device is described below.

Figure 8:
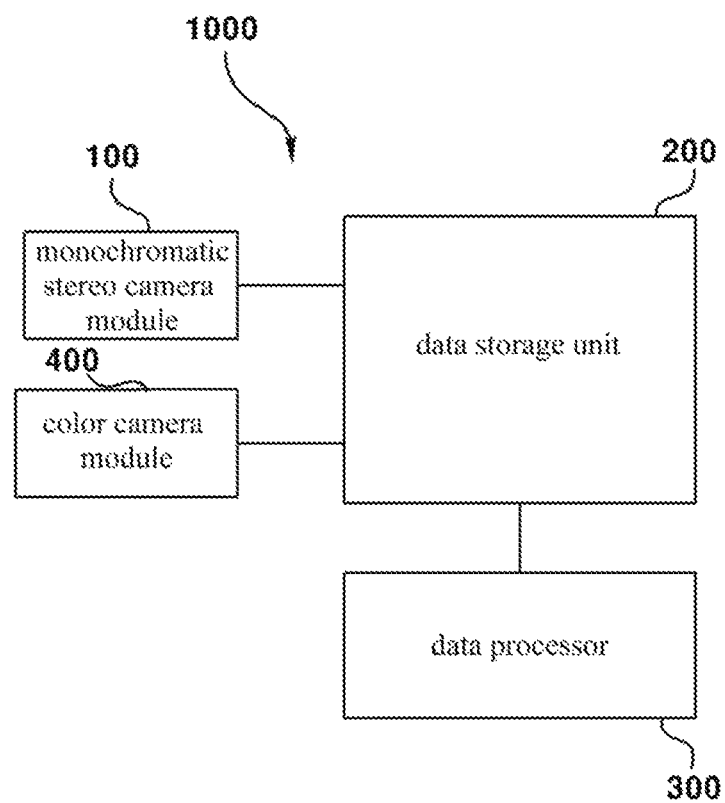
FIG. 8 is a view illustrating a configuration of a depth information producing device according to an embodiment.

FIG. 8 is a view illustrating a configuration of a depth information producing device according to an embodiment.

Referring to FIG. 8, according to an embodiment, a depth information producing device 1000 may include a monochromatic stereo camera module 100 for capturing at least one monochromatic stereo image, a color camera module 400 for capturing a color image from the object, a data storage unit 200 for storing the images captured by the monochromatic stereo camera module 100 and the color camera module 400, and a data processor 300 for processing the images stored in the data storage unit 200. The same or substantially the same description given for the monochromatic stereo camera module 100, data storage unit 200, and data processor 300 as described above in connection with FIG. 4 may apply to the monochromatic stereo camera module 100, the data storage unit 200, and the data processor 100.

The monochromatic stereo camera module 100 may include a first image sensor, a plurality of first lens modules spaced apart from each other on the first image sensor, and a monochromatic filter disposed to allow light paths formed by at least two of the plurality of first lens modules and the first image sensor to pass therethrough. For example, the monochromatic filter may be disposed ahead of the first lens modules or between the first lens modules and the first image sensor. For example, the monochromatic filter, the first lens modules, and the image sensor may be aligned along light paths in the order of the monochromatic filter, the first lens modules, and the image sensor or in the order of the first lens module, the monochromatic filter, and the image sensor.

The color camera module 400 may include a second image sensor, a second lens module disposed on the second image sensor, and a color filter disposed to allow a light path formed by the second lens module and the second image sensor to pass therethrough.

For example, the color filter may be disposed between the second lens module and the second image sensor. For example, the color filter, the second lens module, and the second image sensor may be aligned along the light path in the order of the second lens module, the color filter, and the image sensor.

The color camera module 400 may be a complementary camera module to the monochromatic stereo camera module 100. For example, a blurred region of a color image may differ from a blurred region of at least one of monochromatic images, or the color image may have more pixels per unit area than the monochromatic image. Thus, the color image may be a complementary image to the monochromatic image.

The data processor 300 may perform a complementing process to raise the resolution of at least one of at least two monochromatic images forming a monochromatic stereo image using a color image, and stereo matching, thereby obtaining the depth of a region of interest. In this case, the image complementing process may be limited to the region of interest.

In the depth information producing device 1000 configured as shown in FIG. 8, when there is one color camera module 400, a monochromatic stereo camera module 100 (e.g., GG) whose object plane is positioned far away is configured, and the color camera module 400 is smaller in f-number than the monochromatic stereo camera module 100 to allow the object plane to be positioned at a short distance, allowing the color camera module 400 to serve as a complementary camera module to the monochromatic stereo camera module 100.

According to an embodiment, it is possible to allow the color camera module 400 to be a complementary camera module to the monochromatic stereo camera module 100 by making the object plane of the monochromatic stereo camera module 100 positioned at a shorter distance while making the object plane of the color camera module 400 positioned farther away.

According to an embodiment, where there are two color camera modules 400, a monochromatic stereo camera module 100 whose object plane is positioned at a short distance may be configured while allowing one of the color camera modules 400 to have the object plane positioned at a shorter distance than the monochromatic stereo camera module 100 and the other to have the object plane positioned at a longer distance than the monochromatic stereo camera module 100. By so doing, the two color camera modules 400 may serve as complementary camera modules to the monochromatic stereo camera module 100.

According to an embodiment, where there are two color camera modules 400 and there are two pairs (e.g., a first group and a second group) of monochromatic (e.g., R, G, or B) stereo camera modules 100, the first group of monochromatic stereo camera modules 100 may be rendered to have their object plane positioned at a short distance, the second group of monochromatic stereo camera modules 100 rendered to have their object plane positioned at a longer distance, one of the color camera module 400 rendered to have its object plane positioned at a short distance, and the other color camera module 400 rendered to have its object plane at a longer distance than the one color camera module, so that the two color camera modules 400 may play a role as complementary camera modules to the two groups of monochromatic stereo camera modules 100.

However, without limited thereto, it is apparent to a skilled artisan that it is possible to configure complementary camera modules to the monochromatic stereo camera module 100 in other various manners.

Figure 9:
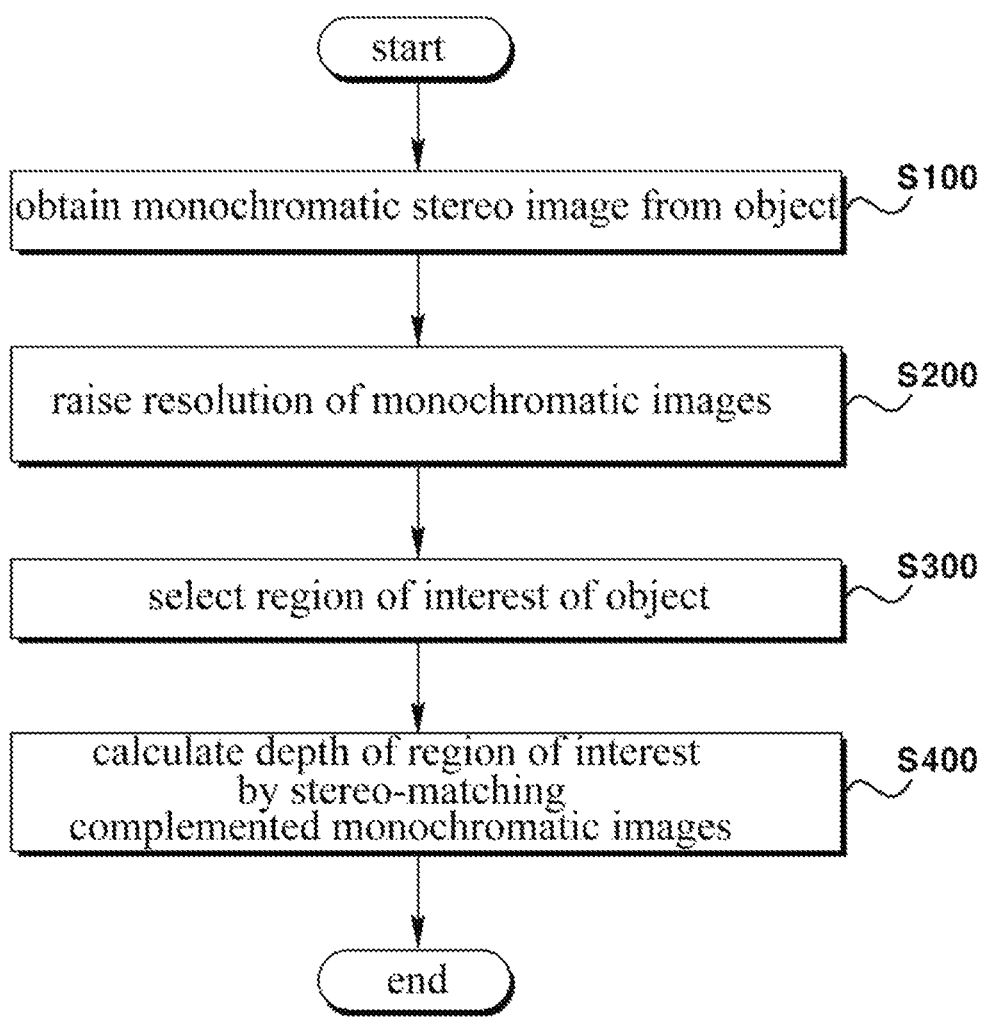
FIG. 9 is a flowchart illustrating a depth information producing method according to an embodiment.

A method for producing depth information according to an embodiment with reference to FIG. 9.

FIG. 9 is a flowchart illustrating a depth information producing method according to an embodiment.

According to an embodiment, a method for producing depth information may include obtaining a plurality of images from an object O through a plurality of lens modules 111 and 112 (S100), producing two complemented monochromatic images by performing a complementary image enhancing process on at least part of the two monochromatic images to thereby increase the resolution (S200), selecting a region of interest of the object O from the two complemented monochromatic images (S300), and calculating the depth of the region of interest by performing stereo matching on the two complemented monochromatic images (S400). In operation S100, the plurality of images may include at least two monochromatic images forming a monochromatic stereo image. In operation S200, the complementary image enhancing process may compare the plurality of images with each of the two monochromatic images and raise the resolution of each of the two monochromatic images using the one image at least partially higher in resolution than the other images.

According to a modification to the embodiment described in connection with FIG. 9, a method for producing planar image may include obtaining a plurality of images from an object O through a plurality of lens modules 111 and 112, wherein the plurality of images may include at least two monochromatic images forming a monochromatic stereo image (e.g., S100), selecting a region of interest of the object O from the two monochromatic images (e.g., S300), producing two complemented monochromatic images by a complementary image enhancing process on the region of interest of the two monochromatic images to thereby increasing the resolution (e.g., S200), and calculating the depth of the region of interest by performing stereo matching on the two complemented monochromatic images (e.g., S400). The complementary image enhancing process may compare the plurality of images with each of the two monochromatic images and raise the resolution of the region of interest of each of the two monochromatic images using the image with a higher resolution in the region of interest than the other images.

In other words, the method according to the modification may have operation S300 and S200 changed in order as compared with the method described in connection with FIG. 9. For example, according to an embodiment, operation S200 of FIG. 9 may be performed earlier than operation S300, or alternatively, operation S300 may be performed earlier than operation S200.

The two monochromatic images may at least partially include different blurred regions, and the complementary image enhancing process may increase the resolution of the blurred region of one of the two monochromatic images using a corresponding region of the other of the two monochromatic images. In other words, the two monochromatic images may be mutually complementary images. In this case, at least some 111 and 112 of the plurality of lens modules may have different f-number values.

Among the plurality of lens modules, two lens modules 111 and 112 forming the two monochromatic images may be spaced apart from each other on the image sensor I. In this case, pixel mismatches may be significantly reduced upon calculating the distance between the positions on the image sensor I.

The plurality of images may include at least one color image of the object O. A blurred region of a color image may differ from a blurred region of at least one of the two monochromatic images, or the color image may have more pixels per unit area than each of the monochromatic images. In this case, the complementary image enhancing process may raise the resolution of the blurred region of at least one of the two monochromatic images using the color image.

The complementary image enhancing process may additionally use a super resolution method to increase the resolution of the region of interest. The super resolution method may use artificial intelligence (AI) data obtained by AI-learning a plurality of low-resolution images and a plurality of high-resolution images corresponding to the plurality of low-resolution images. Thus, the resolution of the two monochromatic images may be further enhanced.

As set forth above, there may be provided a depth information producing method and device capable of reducing blurs, raising resolution, and mitigating calibration errors and pixel mismatches.

According to the embodiments of the disclosure, it is possible to reduce blurs from monochromatic stereo images while raising the resolution of the images, thus mitigating calibration errors and pixel mismatches upon producing depth information, with the result of raised accuracy.

According to the embodiments of the disclosure, it is possible to precisely calculate the depth of a region of interest, making them applicable to various industrial sectors or fields, such as gesture or gaze tracking or face or things recognition with raised accuracy.

Although components may be described as combined or operated in a combination thereof in connection with some embodiments, embodiments of the disclosure are not necessarily limited thereto. For example, one or more of the components may be selective combined together or be operated in a selective combination thereof without departing from the scope of the disclosure. When an element "comprises," "includes," or "has" another element, the element may further include, but rather than excluding, the other element, and the terms "comprise," "include," and "have" should be appreciated as not excluding the possibility of presence or adding one or more features, numbers, steps, operations, elements, parts, or combinations thereof. All the scientific and technical terms as used herein may be the same in meaning as those commonly appreciated by a skilled artisan in the art unless defined otherwise. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The above-described embodiments are merely examples, and it will be appreciated by one of ordinary skill in the art various changes may be made thereto without departing from the scope of the present invention. Accordingly, the embodiments set forth herein are provided for illustrative purposes, but not to limit the scope of the present invention, and should be appreciated that the scope of the present invention is not limited by the embodiments. The scope of the present invention should be construed by the following claims, and all technical spirits within equivalents thereof should be interpreted to belong to the scope of the present invention.

What is claimed is:

1. A method for producing depth information, the method comprising:
   obtaining a plurality of images of an object from a plurality of lens modules, the plurality of images including at least two monochromatic images forming a monochromatic stereo image;
   producing two complemented monochromatic images by performing a complementary image enhancing process on at least part of the two monochromatic images, the complementary image enhancing process including comparing the plurality of images with each of the two monochromatic images and increasing a resolution of each of the two monochromatic images using an image having a higher resolution in the at least part;
   selecting a region of interest of the object from the two complemented monochromatic images; and
   calculating a depth of the region of interest by stereo-matching the two complemented monochromatic images, wherein the plurality of images include at least one color image of the object, wherein the color image includes a blurred region different from a blurred region of at least one of the two monochromatic images or includes more pixels per unit area than each of the two monochromatic images, and wherein the complementary image enhancing process includes increasing a resolution of the blurred region of the at least one of the two monochromatic images using the color image.

2. The method of claim 1, wherein obtaining the plurality of images from the plurality of lens modules, selecting the region of interest, producing the two complemented monochromatic images, and calculating the depth of the region are performed in an order thereof.

3. The method of claim 1, wherein the two monochromatic images at least partially include different blurred regions, and wherein the complementary image enhancing process includes increasing the resolution of the blurred region of one of the two monochromatic images using a corresponding region of the other of the two monochromatic images.

4. The method of claim 2, wherein the two monochromatic images at least partially include different blurred regions, and wherein the complementary image enhancing process includes increasing the resolution of the blurred region of one of the two monochromatic images using a corresponding region of the other of the two monochromatic images.

5. The method of claim 1, wherein at least some of the plurality of lens modules have different f-numbers.

6. The method of claim 2, wherein at least some of the plurality of lens modules have different f-numbers.

7. The method of claim 1, wherein among the plurality of lens modules, two lens modules configured to form the two monochromatic images are spaced apart from each other on an image sensor.

8. The method of claim 2, wherein among the plurality of lens modules, two lens modules configured to form the two monochromatic images are spaced apart from each other on an image sensor.

9. The method of claim 1, wherein the complementary image enhancing process includes further using a super resolution method to increase the resolution of the region of interest.

10. The method of claim 2, wherein the complementary image enhancing process includes further using a super resolution method to increase the resolution of the region of interest.

11. The method of claim 9, wherein the super resolution method includes using artificial intelligence (AI) data obtained by AI-learning a plurality of low-resolution images and a plurality of high-resolution images corresponding to the plurality of low-resolution images.

12. The method of claim 10, wherein the super resolution method includes using artificial intelligence (AI) data obtained by AI-learning a plurality of low-resolution images and a plurality of high-resolution images corresponding to the plurality of low-resolution images.

13. A device for producing depth information, the device comprising:
a monochromatic stereo camera module configured to capture at least one monochromatic stereo image from an object;
a color camera module configured to capture a color image from the object;
a data storage unit configured to store the images captured by the monochromatic stereo camera and the color camera module; and
a data processor configured to process the images stored in the data storage unit, wherein the monochromatic stereo camera module includes a first image sensor, a plurality of first lens modules spaced apart from each other on the first image sensor, and monochromatic filters disposed to allow light paths formed by the first image sensor and each of at least two of the plurality of first lens modules to pass therethrough, and wherein the color camera module includes a second image sensor, a second lens module disposed on the second image sensor, and a color filter disposed to allow a light path formed by the second lens module and the second image sensor to pass therethrough, wherein the data processor is configured to calculate a depth of a region of interest by performing a complementing process to a resolution of at least one of at least two monochromatic images forming the monochromatic stereo image using the color image and performing stereo matching, wherein the color image is configured to be a complementary image to the monochromatic image by including a blurred region different from a blurred region of at least one of the at least two monochromatic images or including more pixels per unit area than the monochromatic images.

14. The device of claim 13, wherein the monochromatic stereo camera module includes a lens formed of a metamaterial.

* * * * *